Feb. 9, 1932. H. HEIMBERGER 1,844,251
HYDRAULIC DRIVE
Filed Jan. 13, 1930 2 Sheets-Sheet 1

Inventor:
Hermann Heimberger

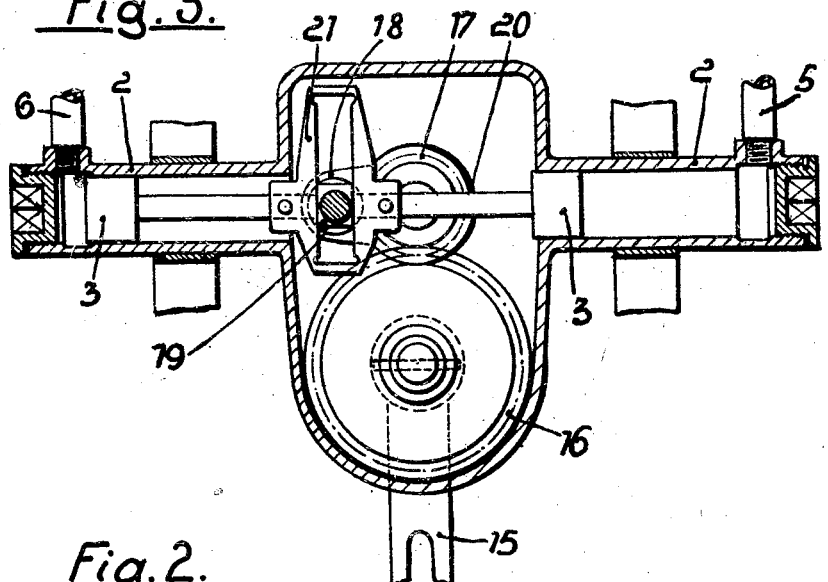
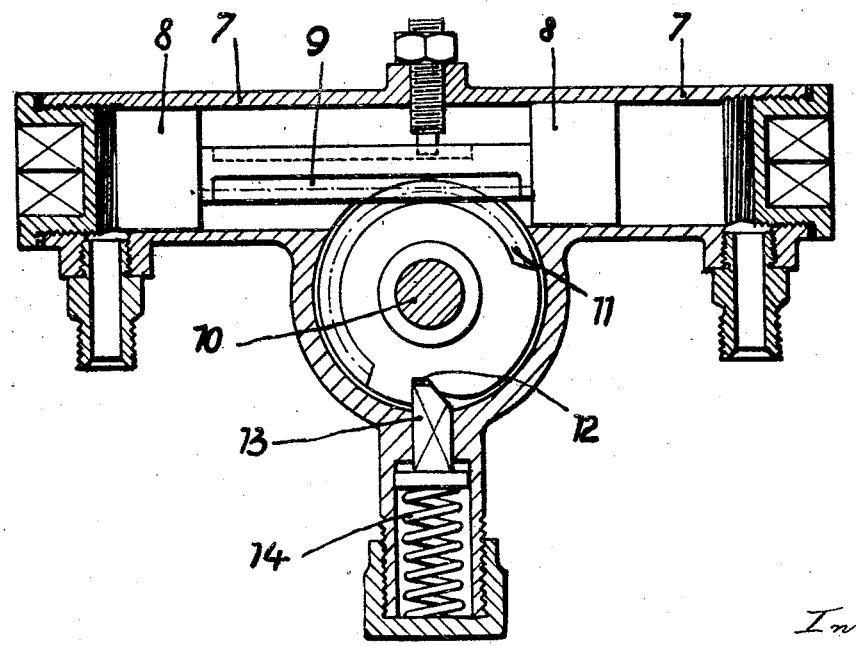

Patented Feb. 9, 1932

1,844,251

UNITED STATES PATENT OFFICE

HERMANN HEIMBERGER, OF REUTLINGEN, GERMANY

HYDRAULIC DRIVE

Application filed January 13, 1930, Serial No. 420,612, and in Germany December 5, 1929.

The present invention relates to a hydraulic drive for movable and inclinable headlights of motor vehicles, the device embodying the invention being constructed so that each of the two headlights may be moved separately and both be inclined together in order to provide proper lighting when negotiating a curve.

The two headlights are suitably controlled from the steering-wheel of the vehicle and the actuating means of both placed simultaneously under liquid pressure, the headlight not to be moved however being automatically kept in its "straight" position while a special locking device nevertheless permits a motion in the other direction.

Figure 1:
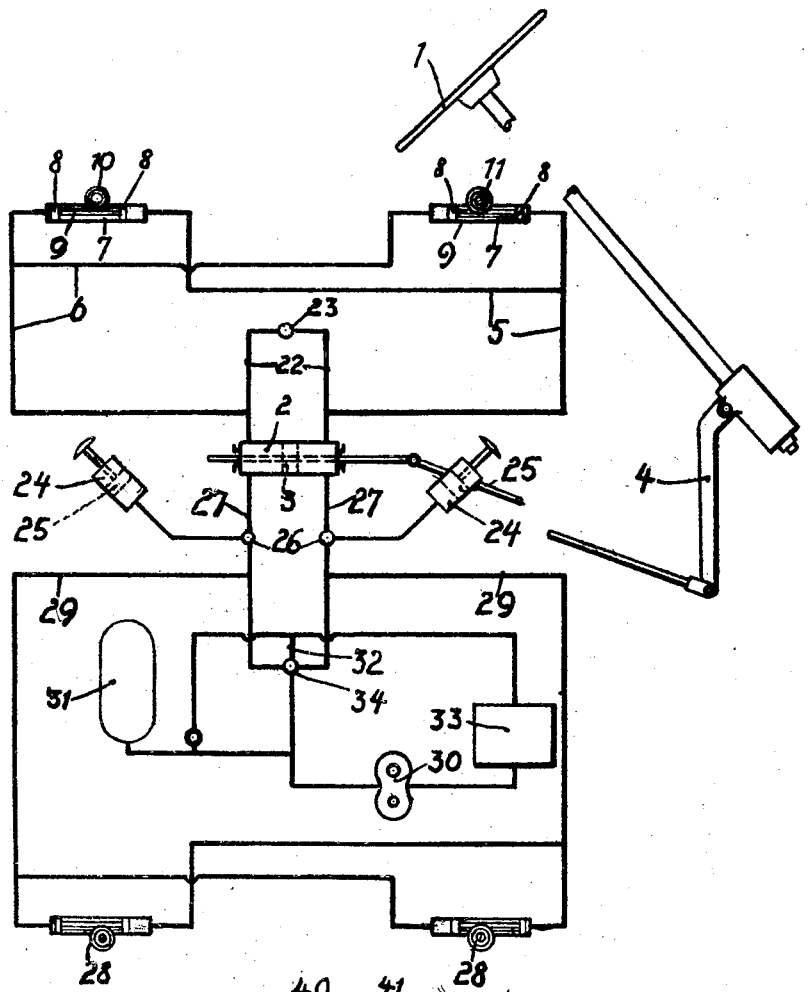

By way of example, the invention is illustrated in the accompanying drawings, in which Figure 1 is a diagrammatic view of the invention; Fig. 2, a horizontal axial section of the moving device of one headlight; Fig. 3, a horizontal axial section of the controlling cylinder of an improved modification; and Fig. 4, a longitudinal section of the tilting device to be combined with the moving device.

According to the modification shown in Fig. 1 the headlights are controlled from the steering-wheel 1 of the vehicle, for which purpose a liquid cylinder 2 is provided whose piston 3 is controlled by the steering lever 4 of the steering gear. From the chambers before and behind the piston 3 the conduits 5 and 6 lead to two cylinders 7 forming part of the two moving or slewing devices of the headlights. Within the cylinders 7 the double pistons 8 are disposed with the intermediate rack 9 engaged by a pinion 11 arranged on the headlight shaft 10.

Moreover, a stopping device is provided permitting only one of the headlights to move while the position of the other one remains unaltered, the one permitted to move being, for example, the headlight located on the inside of a curve. In the embodiment shown, the stopping device consists of a notch 12 in the pinion 11, which is engaged by a projection 13 owing to the pressure of a spring 14. The notch 12 is so shaped as to prevent the pinion 11 from turning in one direction (counter clockwise in Fig. 2) while motion in the other direction becomes possible only under considerable braking produced by providing a suitable pitch of the lateral surface of the said notch. The radial or stopping surface of the notch 12 is arranged oppositely in the two headlights.

When the controlling piston 3 (Fig. 1) has been drawn to the right, only the piston 8 in the right-hand cylinder 7 has been shifted by the pressure of the liquid, i. e., only its headlight has been shifted while the piston 8 in the cylinder 7 of the left-hand headlight is held in position by the notch 12 and the lug 13. If straight driving is resumed again and the controlling piston 3 thus returned to the central position, the previously shifted piston 8 of the right-hand headlight is pressed back into locking position owing to the liquid pressure developed in the piping 6, while the left-hand piston 8 remains immovable, because the resistance produced by the pitch of the notch 12 is greater than the friction between the lug 13 and the outer surface of the right-hand pinion 11.

On the other hand, if the controlling piston 3 (Fig. 1) be moved to the left, the other headlight will be shifted.

Fig. 3 discloses a modification of the apparatus for controlling the piston 3. In this case an in-built gear is employed which at first moves the headlight more rapidly than at the end of its motion, a lever 15 being shifted by the steering gear and caused to act on a pinion 17 by means of a gear wheel 16. The pinion 17 moves a lever 18 carrying a sliding block 19 adapted to shift in a link 21 arranged on the rod 20 of the piston 3. In this way the control piston 3 is moved to and fro at each steering action, and the headlight will always illuminate the curve in a highly satisfactory manner provided the gearings are dimensioned properly. By slightly tilting the headlight shaft 10 to the rear the rays of light will be lowered when the headlight concerned is moved so as to obtain good light for the road.

To prevent the motion of the headlights during the day, a conduit 22 connecting the two chambers of the control cylinder 2 before and behind the piston 3 has been provided with a shutting-off cock 23. When the cock 23 is opened, the pressures within the cylinder 2 at both sides of the piston 3 are equalized so that no motion can take place.

Fig. 1 shows still another modification for controlling the headlights which can be controlled also independently of the steering gear by means of a device that is actuated separately. In the modification shown a pressure piston 25 operated by hand or foot is provided for this purpose for each side, and each cylinder 24 is in communication with the control cylinder 2 by means of a conduit 27 fitted with the seal 26.

According to the invention, the headlights can be tilted also by means of a device the drive of which corresponds to that for the moving device. This can be effected by one of the two pistons 25 actuated independently from the steering gear if suitable seals 26 have been chosen. This arrangement is shown in the lower portion of Fig. 1 and briefly and collectively referred to by the numeral 28.

For the purpose stated special conduits 29 lead from the conduits 27 to the cylinders of the devices 28 for tilting the headlights. By shifting one of the pistons 25 the driving shaft 10 of the devices 28 is moved and the other piston 25 pressed back owing to the pressure of the liquid. By depressing the proper piston all parts are again brought into normal position.

Figure 4:
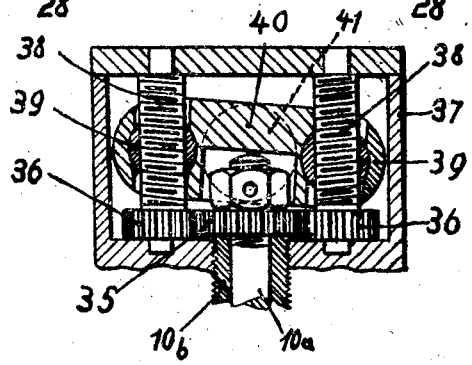

Devices in which the tilting of the headlights is effected by turning the driving shafts are shown by way of example in Fig. 4, the driving shaft for the tilting mechanism being disposed in the hollow driving shaft of the shifting device.

In vehicles provided with lubrication by circulation for the engine the oil employed for lubrication can be used also for tilting. In view of the relatively small quantity delivered by the type of oil pump 30 usually employed behind it an air chamber 31 is provided as a reservoir of energy. In case of overpressure in the vessel 31, and in the daytime, pressure is relieved by a piping 32 leading to the oil collector 33. If tilting is then to be effected from the air chamber 31, the shutting-off members 26 are adjusted accordingly. The actuation of a control valve 34, for example, causes oil to enter the cylinders of the device 28 through the left-hand conduit and the displaced oil flows through the valve 34 and through the conduit 32 to the collector 33, while a reversal of the valve 34 causes the headlights to return automatically to normal position.

If the moving and tilting devices for the headlights are combined, tilting can take place automatically at each motion. Fig. 4 shows a part of such a device, the cylinders of both devices being disposed in a common casing so that the cylinder for tilting is underneath.

The shaft 10a of the inclining device passes through the hollow shaft 10b and carries a gear 35 in mesh with two diametrically opposed pinions 36 rotatably arranged in a head 37 of the shaft 10b on screws 38 having right and left-handed threads respectively. The screws 38 are screwed through nuts positioned to be loosely movable in the ends of a rocker 40 which can be moved within the casing 37 by means of the cross pins 41 extending beyond the casing and carrying the headlights.

Thus the casing 37 with the rocker 40 and the headlight concerned is moved on the shifting of the shaft 10b and, simultaneously, the rocker 40 with its headlight inclined.

I claim:—

1. Hydraulic operating means for swinging and inclining the headlights on automotive vehicles, comprising in combination a single double-acting piston pump common to both headlights; a speed change gear interposed between said pump and the steering mechanism whereby said pump is operated by said steering mechanism; a piston motor for swinging each headlight which is operated by the pump and a device arranged to control the driving liquid furnished by the pump in such manner that that headlight which is on the inside of the curve when the direction of travel of the vehicle changes will be swung in and out while swinging of the other headlight is prevented, and other means for simultaneously inclining the first headlight downwardly.

2. A hydraulic operating means as in claim 1 in further combination with a separate inclining device whereby both headlights may be lowered or raised in any desired position independently of the swinging movement.

3. A hydraulic operating means as in claim 1, wherein the control device consists of a wedge-shaped, spring-actuated latch, a rotary member having gear teeth on one portion of its periphery and having a notch which is bounded by a substantially radial surface on one side and by an inclined surface on the other, cooperating with said latch, and a casing, said rotary member being arranged in said casing and secured to the swinging shaft of the headlight.

4. A hydraulic operating means in accordance with claim 1 wherein there is a gear wheel on the shaft of each headlight, and each headlight swinging device has two pistons and a connecting rod formed as a rack bar which meshes with the gear wheel located upon the shaft of the said headlight.

5. A hydraulic operating means in accordance with claim 1 wherein the pump has two pistons and a connecting rod, said rod being formed as a guide, a gear wheel driven by the steering mechanism, a crank actuated by said gear wheel, and a lug on said crank sliding in said guide.

6. A hydraulic operating means in accordance with claim 1 wherein a separate inclining device is provided, to incline the headlights as desired independently of the swinging, said inclining device being arranged in a common control block with the other operating devices.

7. A hydraulic operating means in accordance with claim 1 wherein the means for inclining the headlights is guided by the operating shaft of the headlight swinging device; said shaft being hollow; a gear wheel on the lower end of said shaft and a piston rod in the inclining device, which is formed as a rack bar, said gear wheel being in mesh with said rack bar to be actuated thereby.

8. A hydraulic operating means in accordance with claim 1 having a gear wheel on the swinging device shaft, and means for operating the same; a second gear wheel provided upon the drive shaft for the inclining means; a housing; gear wheels supported therein, in mesh with said second gear wheel, connected with the drive shaft for the swinging device; screw spindles carrying said gears and having oppositely moved nuts thereon; and a carrier connecting same and having lateral pins, which carry the headlight, journaled in the housing connected with the drive shaft for the headlight swinging means.

9. A hydraulic operating means as in claim 1 wherein two auxiliary pumps are provided which can be put in service at desire, and which can be used for actuating either the swinging device or the inclining means.

10. A hydraulic operating means in accordance with claim 1 wherein the oil under pressure necessary for the actuation of the inclining means of the headlights is delivered by an oil pump, for example a lubricating oil pump already present in the vehicle, and wherein a small air chamber is provided for storing same, the oil being conducted therefrom to the actuating device; oil pressure conduits for same, and a multiple way cock therein which is operable from the driver's seat of the vehicle.

In testimony whereof I affix my signature.

HERMANN HEIMBERGER.